UNITED STATES PATENT OFFICE.

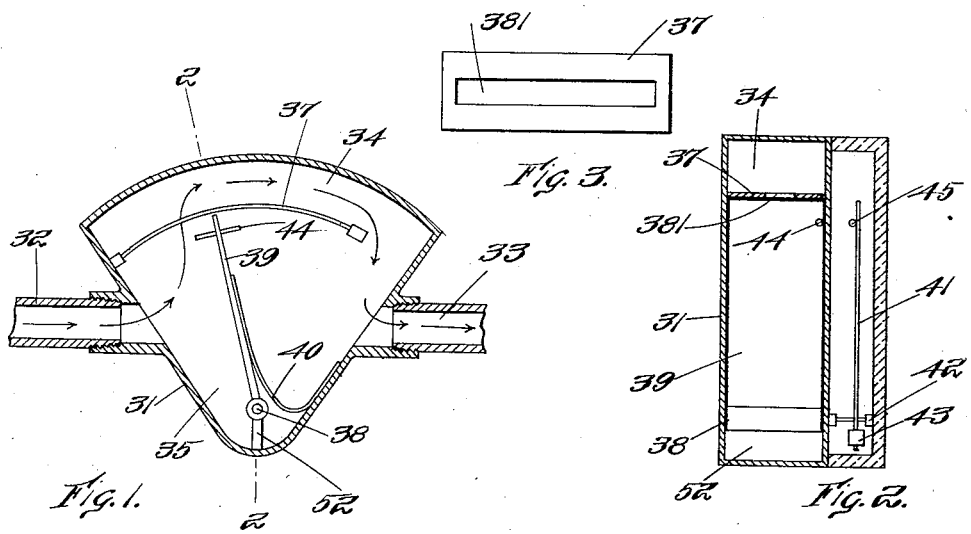

JOHN F. VAUGHAN, OF CAMBRIDGE, MASSACHUSETTS.

FLOW-INDICATOR.

1,111,684.

Specification of Letters Patent. Patented Sept. 22, 1914.

Application filed March 26, 1912. Serial No. 686,427.

*To all whom it may concern:*

Be it known that I, JOHN F. VAUGHAN, a citizen of the United States, residing at Cambridge, county of Middlesex, State of Massachusetts, have invented a certain new and useful Improvement in Flow-Indicators, of which the following is a specification, reference being had therein to the accompanying drawings.

The present invention has for its object to provide means for indicating the rate of flow of a fluid in an open or closed conduit, and is intended to be used to measure the rate of flow of any fluid, but particularly water, oil, steam, gas and air. It is so constructed that it will measure the rate of flow regardless of the pressure in the conduit.

The invention comprising the subject matter of the present application consists in general of a hollow segmental vessel separated into two chambers by a slotted partition and a member movable relatively to the slotted partition to open the slot more or less in accordance with the rate of flow, the member being moved by the difference in pressure on the sides thereof caused by the flow through the orifice.

In the accompanying drawings I have shown my invention as embodied in a vessel of segmental form which may be made either wholly of metal, or partly of metal and partly of glass. As this form of flow indicator may be made entirely of metal it is convenient for use where the liquid, the flow of which is to be measured is likely to stain the glass. It is also especially adapted to be used with recording mechanism to make a permanent record of the rate of flow.

The invention will be fully understood from the following description taken in connection with the accompanying drawings and the novel features will be pointed out and clearly defined in the claims at the close of the specification.

In the drawings, Figure 1 is a section of a segmental flow indicator embodying my invention. Fig. 2 is a section on line 2—2 of Fig. 1. Fig. 3 is a side elevation of the partition shown in Fig. 1.

Referring now to the drawings, in Figs. 1 and 2 there is indicated at 31 a metal casing of segmental form. At 32 is shown an inlet pipe, and at 33 an outlet pipe. The interior of the metal casing is separated into two chambers, 34 and 35, by a partition 37 (see also Fig. 3) having therein a slot which forms a port between one chamber 35 and the other chamber 34. At 38 is pivoted a movable member 39 which extends from the pivot 38 to the partition 37. The end of the movable member 39 is as close to the partition 37 as possible, without undue friction, and, as the partition 37 is formed in the arc of a circle having the pivot 38 as a center, the movable member may be moved about the center 38. At 52 is shown a wall extending from the casing of the device to the bottom of the movable member 39 to prevent flow to the back side of the movable member. The flow of fluid through the inlet 32 into the chamber 35 pushes the movable member 39 away from the inlet 32 until it comes to rest in a position dependent upon the rate of flow through the instrument. The movable member 39 is returned to normal position by means of a spring 40.

When the entire casing is made of metal, I provide an indicating needle which is constructed and operates in the following manner: This needle is shown at 41 in Fig. 2 and is mounted on a suitable jeweled bearing at 42, being counterweighted at 43. The center of the bearing is in line with the axis of the pivot 38 about which the movable member 39 swings. The movable member 39 is provided with a small magnet 44, while the needle 41 is provided with a piece of soft iron 45, so that, when the movable member is moved by a change of flow of the fluid, the needle 41, although mechanically unconnected with the movable member will follow it.

It results from this construction that it is possible to construct the casing of the device entirely of opaque material such as metal and yet have a visible needle which accurately indicates the changes in the position of the movable member. This device is particularly adapted for use in connection with gases like steam, and with liquids which tend to discolor or break the glass. However while this is a desirable and convenient method of causing the needle to move with the movable member, I do not limit myself to it as other constructions may be preferable under some conditions.

While I have shown the partition as slotted, it is obvious that it may be otherwise perforated and therefore in the claims I have used the word "perforated" to include any partition having a passage therethrough regardless of the shape or number of the passages.

In the foregoing specification I have referred to the movable member as moved by the difference in pressure. A careful analysis of the conditions obtaining in the fluid, causes me to believe that there is always a constant difference in pressure between the two chambers of the instrument, and that when a change in the rate of flow of the fluid through the instrument occurs, the movable member moves until it has changed the area of the opening through the partition sufficiently to restore the constant difference in pressure between the two chambers. This constant difference in pressure between the two chambers is maintained regardless of the initial pressure in the fluid in the conduit and is varied only by change in the rate of flow of the fluid through the instrument.

What I claim is:

1. A flow indicator comprising a casing divided into two chambers by a perforated partition, a movable pivoted member located in one of said chambers and dividing it into two spaces of variable size, and yielding means acting on said movable member, said movable member coöperating with said perforated partition so that it is moved by a fluid flowing through said indicator to a point of equilibrium determined by the balance of pressure on both sides of said pivoted member, a pointer, and means whereby movement of the pivoted member will produce a corresponding movement of the pointer.

2. A flow indicator comprising a casing divided into two chambers by a perforated partition, a movable pivoted member located in one of said chambers and dividing it into two spaces of variable size, yielding means acting on said movable member, a pointer mechanically independent of said movable member, and magnetic means carried by one of said members to operate the said pointer, said movable member coöperating with said perforated partition so that it is moved by a fluid flowing through said indicator to a point of equilibrium determined by the balance of pressure on both sides of said pivoted member.

3. A flow indicator comprising a casing divided into two chambers by a perforated partition, a movable pivoted member located in one of said chambers and dividing it into two spaces of variable size, a spring acting on said movable member, said movable member coöperating with said perforated partition so that it is moved by a fluid flowing through said indicator to a point of equilibrium determined by the force of said spring and the balance of pressure on both sides of said movable member, a pointer located outside of said chamber and mechanically independent of said movable member, and magnetic means carried by one of said members to operate the pointer.

4. A flow indicator comprising a casing divided into two chambers by a perforated partition, a movable pivoted member located in one of said chambers and dividing it into two spaces of variable size, a spring acting on said movable member, said movable member coöperating with said perforated partition so that it is moved by a fluid flowing through said indicator to a point of equilibrium determined by the force of said spring and the balance of pressure on both sides of said movable member, a pointer located outside of said chamber and mechanically independent of said movable member, and magnetic coöperating members on said movable member and said pointer respectively whereby movement of the movable member will produce a corresponding movement of the pointer.

5. The flow indicator comprising a chamber of segmental form having two radial sides and a curved side, an inlet pipe entering one radial side, an outlet pipe connected with the other radial side, an arcuate partition concentric with the curved side and having a longitudinal slot therein, said partition being relatively shorter than the said curved side so that there is an open space around the end of the partition at the outlet side, a movable member pivoted at one end at the center about which said partition and curved side are formed and having its free end in contact with said partition, and a spring acting on the said movable member against the force of the fluid from the inlet side, the path of the fluid through the device being along one side of the movable member through the slot in the partition between the curved side of the chamber and the partition and to the outlet pipe, a pointer, and means whereby movement of the pivoted member will produce a corresponding movement of the pointer.

In testimony whereof I affix my signature, in presence of two witnesses.

JOHN F. VAUGHAN.

Witnesses:
George P. Dike,
Alice H. Morrison.